US010644776B2

(12) United States Patent
Lee et al.

(10) Patent No.: US 10,644,776 B2
(45) Date of Patent: May 5, 2020

(54) METHOD AND DEVICE FOR PROVIDING FEEDBACK SIGNAL IN WIRELESS COMMUNICATION SYSTEM USING TWO-DIMENSIONAL ANTENNA

(71) Applicant: Samsung Electronics Co., Ltd., Gyeonggi-do (KR)

(72) Inventors: Keonkook Lee, Gyeonggi-do (KR); Taeyoung Kim, Seoul (KR); Jiyun Seol, Gyeonggi-do (KR); Jaeseung Son, Gyeonggi-do (KR); Suryong Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 110 days.

(21) Appl. No.: 15/575,727

(22) PCT Filed: May 19, 2016

(86) PCT No.: PCT/KR2016/005307
§ 371 (c)(1),
(2) Date: Nov. 20, 2017

(87) PCT Pub. No.: WO2016/186462
PCT Pub. Date: Nov. 24, 2016

(65) Prior Publication Data
US 2018/0359013 A1  Dec. 13, 2018

(30) Foreign Application Priority Data

May 19, 2015  (KR) .................. 10-2015-0069909

(51) Int. Cl.
*H04L 5/00* (2006.01)
*H04B 7/0456* (2017.01)
(Continued)

(52) U.S. Cl.
CPC ......... *H04B 7/0626* (2013.01); *H04B 7/0417* (2013.01); *H04B 7/0469* (2013.01);
(Continued)

(58) Field of Classification Search
CPC .. H04B 7/0469; H04B 7/0617; H04B 7/0632; H04L 25/03898
(Continued)

(56) References Cited

U.S. PATENT DOCUMENTS

2013/0242773 A1     9/2013   Wernersson et al.
2014/0098689 A1*    4/2014   Lee .................... H04B 7/0469
                                                        370/252
(Continued)

FOREIGN PATENT DOCUMENTS

KR    1020150035555    4/2015
WO    WO 2012/091342    7/2012
(Continued)

OTHER PUBLICATIONS

PCT/ISA/210 Search Report dated PCT/KR2016/005307 (pp. 3).
PCT/ISA/237 Written Opinion dated PCT/KR2016/005307 (pp. 5).

*Primary Examiner* — Khaled M Kassim
*Assistant Examiner* — Jason A Harley
(74) *Attorney, Agent, or Firm* — The Farrell Law Firm, P.C.

(57) ABSTRACT

Disclosed is a 5G or pre-5G communication system to be provided for supporting a data transmission rate higher than that of a 4G communication system such as LTE. According to one embodiment of the present invention, a method by which a base station of a wireless communication system using a two-dimensional X-Pol antenna requests feedback information, can comprise the steps of: generating control information for commanding the generation of the feedback information and channel state information (CSI) process
(Continued)

information on vertical axes and horizontal axes of a specific planar antenna and respective planar antennas of the two-dimensional X-Pol antenna; transmitting the generated control information to a terminal in the base station; generating and transmitting a reference signal corresponding to the CSI process; and receiving, from at least one terminal, feedback information in correspondence to the number of CSI processes.

16 Claims, 14 Drawing Sheets

(51) Int. Cl.
 *H04L 25/03* (2006.01)
 *H04B 7/0417* (2017.01)
 *H04B 7/06* (2006.01)
(52) U.S. Cl.
 CPC ......... *H04B 7/0478* (2013.01); *H04B 7/0617* (2013.01); *H04B 7/0632* (2013.01)

(58) Field of Classification Search
 USPC .......................................... 370/329; 455/450
 See application file for complete search history.

(56) References Cited

U.S. PATENT DOCUMENTS

| | | | |
|---|---|---|---|
| 2014/0211873 A1 | 7/2014 | Park et al. | |
| 2014/0254517 A1* | 9/2014 | Nam | H04B 7/0417 370/329 |
| 2015/0078271 A1 | 3/2015 | Kim et al. | |
| 2015/0365948 A1* | 12/2015 | Kim | H04L 5/0048 370/329 |
| 2016/0021551 A1 | 1/2016 | Park et al. | |
| 2016/0211902 A1 | 7/2016 | Park et al. | |
| 2016/0248169 A1* | 8/2016 | Mohammadian | H01Q 9/0407 |
| 2017/0019159 A1* | 1/2017 | Vook | H04B 7/0478 |

FOREIGN PATENT DOCUMENTS

| | | |
|---|---|---|
| WO | WO 2014/157824 | 10/2014 |
| WO | WO 2015/060680 | 4/2015 |

\* cited by examiner

METHOD AND DEVICE FOR PROVIDING FEEDBACK SIGNAL IN WIRELESS COMMUNICATION SYSTEM USING TWO-DIMENSIONAL ANTENNA

PRIORITY

This application is a National Phase Entry of PCT International Application No. PCT/KR2016/005307 which was filed on May 19, 2016, and claims priority to Korean Patent Application No. 10-2015-0069909, which was filed on May 19, 2015, the content of each of which is incorporated herein by reference.

TECHNICAL FIELD

The present invention relates to a method and a device for providing a feedback signal in a wireless communication system, and more particularly, to a method and a device for providing a feedback signal in a wireless communication system using a two-dimensional antenna.

BACKGROUND ART

In order to meet the wireless data traffic demand that is on an increasing trend after commercialization of 4G communication system, efforts for developing improved 5G communication system or pre-5G communication system have been made. For this reason, the 5G communication system or pre-5G communication system has been called beyond 4G network communication system or post LTE system.

In order to achieve high data rate, implementation of 5G communication system in a millimeter Wave (mmWave) band, for example, 60 GHz band, has been considered. In order to mitigate a radio wave path loss and to increase a radio wave transmission distance in the mmWave band, technologies of beam-forming, massive MIMO, full dimension MIMO (FD-MIMO), analog beam-forming, and large scale antenna for the 5G communication system have been discussed.

Further, for system network improvement in the 5G communication system, technology developments have been made for an evolved small cell, advanced small cell, cloud radio access network (cloud RAN), ultra-dense network, device to device (D2D) communication, wireless backhaul, moving network, cooperative communication, coordinated multi-points (CoMP), and reception interference cancellation.

In addition, hybrid FSK and QAM modulation (FQAM) and sliding window superposition coding (SWSC), which correspond to advanced coding modulation (ACM) system, and filter bank multi carrier (FBMC), non-orthogonal multiple access (NOMA), and sparse code multiple access (SCMA), which correspond to advanced connection technology, have been developed in the 5G system.

On the other hand, with the rapid spread of wireless communication devices, demand for mobile communication data has been abruptly increased. In order to cope with such abruptly increased demand for mobile communication data, various technologies for improvement of a data rate have been developed. As one method for improvement of the transfer rate and increase of the capacity of a wireless communication system, there is a method for performing communication through increasing the number of antennas between a transmitter and a receiver.

The technology to increase the system capacity using a large number of antennas has the advantage that the performance of the system is increased in proportion to the number of antennas provided in a transceiver. However, in an actual environment, due to constraint requirements of a terminal having limitations in physical size, there is a limit in increasing the number of antennas, and due to this, it is not possible to increase the transmission capacity through a point-to-point MIMO technology. In order to overcome this, a multi-user MIMO (MU-MIMO) scheme has been introduced, which heightens a downlink transfer rate through a point-to-multipoint technology in which a large number of antennas are mounted on a base station having a large physical size and data is simultaneously transmitted to a plurality of terminals.

Since the MU-MIMO system transmits signals simultaneously to several users, interference between the users who receive the signals may deteriorate the performance, and in order to overcome this, a technology capable of controlling the interference between the users is necessary. The transmitter may acquire channel information of the multiple users, and may perform precoding for controlling the interference to make MU-MIMO transmission possible. In this process, the transmission end surely requires channel information of the receiver to which the transmission end intends to transmit the signal. In the case of a wireless network using a TDD, the transmission end acquires the channel information through an uplink reference signal. In contrast, in the case of a wireless network using an FDD, the transmitter acquires the channel information in a manner that the receiver estimates the channel information and feeds the estimated channel estimation back to the transmitter through uplink transmission.

Even an L (or LTE-Advanced) system, which is mostly used for cellular communication, adopts a technology in which the receiver feeds back channel information and the transmitter uses the channel information to perform MIMO/MU-MIMO transmission.

On the other hand, antennas having various shapes may be used in a wireless communication device, and cross polarization (XPOL) antennas in a rectangular panel shape (2D) are mostly used. The XPOL antennas, the number of which is double the number of co-polarization (COPOL) antennas, can be arranged in the same space as compared with the COPOL antennas, and thus they are efficient for multi-antenna transmission.

Further, the channel information feedback technology as described above should be designed so as to well reflect the wireless channel characteristics, and the wireless channel characteristics are affected by the antenna shape. That is, in the case of assuming a transmitter using the XPOL antenna, it is essential to design a channel information feedback that suits the XPOL antenna. Even in the LTE system, feedback designs that suit both the COPOL antenna and the XPOL antenna have been considered.

Up to now, most MIMO-MU-MIMO technologies have been designed on the assumption of one-dimensional (1D) arrays in which antennas are one-dimensionally configured, and antenna installation and MIMO scheme application in a horizontal dimension having various user distributions have been mainly considered. However, recently, as the user distribution in a vertical dimension is increased in an urban environment in which many high-rise buildings are distributed, development of a three-dimensional (3D) MIMO scheme using a two-dimensional (2D) array has been concerned. In the case of applying the 2D array to the MIMO transmission, it is essential to design a channel information feedback scheme in consideration of this.

However, up to now, a channel information feedback scheme for utilizing a 2D array has not yet been proposed.

DISCLOSURE OF INVENTION

Technical Problem

Accordingly, aspects of the present invention provide a method and a device for channel information feedback in consideration of an antenna shape using a 2D-array cross polarization (X-Pol) antenna.

Further, aspects of the present invention provide a method and a device capable of improving throughput in a wireless communication system through a more accurate channel information feedback.

Solution to Problem

In one aspect of the present invention, a method for a base station to request feedback information in a wireless communication system using a 2D cross polarization (X-Pol) antenna includes generating channel state information (CSI) process information on respective planar antennas of the 2D X-Pol antenna and vertical and horizontal axes of a specific planar antenna and control information instructing generation of the feedback information; transmitting the generated control information to a terminal in the base station; generating and transmitting a reference signal corresponding to the CSI process; and receiving the feedback information from at least one terminal corresponding to the number of times of the CSI process.

In another aspect of the present invention, a method for a terminal to generate and transmit feedback information in a wireless communication system using a 2D cross polarization (X-Pol) antenna includes receiving channel state information (CSI) process information on respective planar antennas of the 2D X-Pol antenna and vertical and horizontal axes of a specific planar antenna and control information instructing generation of the feedback information; receiving a reference signal corresponding to the CSI process; generating CSI feedback information using the reference signal received corresponding to the CSI process; and transmitting the generated CSI feedback information to a base station.

In still another aspect of the present invention, a base station in a wireless communication system using a 2D cross polarization (X-Pol) antenna includes the 2D X-Pol antenna; a base station controller configured to generate channel state information (CSI) process information on respective planar antennas of the 2D X-Pol antenna and vertical and horizontal axes of a specific planar antenna and control information instructing generation of the feedback information, and to control generation of a reference signal; and a base station communicator configured to transmit the generated control information and the reference signal to a terminal, and to receive the feedback information corresponding to the CSI process from the terminal.

In yet still another aspect of the present invention, a terminal to generate and transmit feedback information in a wireless communication system using a 2D cross polarization (X-Pol) antenna includes a terminal communicator configured to receive channel state information (CSI) process information on respective planar antennas of the 2D X-Pol antenna and vertical and horizontal axes of a specific planar antenna, control information instructing generation of the feedback information, and a reference signal; and a terminal controller configured to generate CSI feedback information based on the received control information using the reference signal received corresponding to the CSI process, and to control transmission of the generated CSI feedback information.

Advantageous Effects of Invention

In accordance with the present invention, in the wireless communication system using the 2D-array X-Pol antenna, more accurate channel quality can be measured through measurement of the channel quality for each polarization. Further, 3D beamforming is performed using the more accurate channel quality measurement information, and thus higher data rate can be provided.

MODE FOR THE INVENTION

Figure 1:
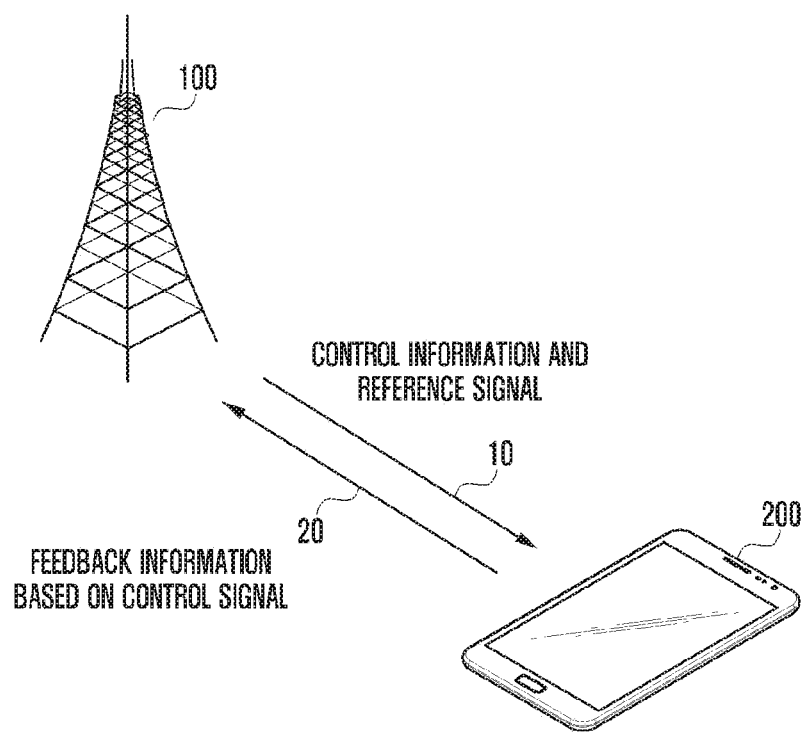
FIG. 1 is a conceptual diagram explaining transmission of a control signal between a base station and a terminal and providing of feedback information thereof in a wireless communication system according to the present invention.

Hereinafter, embodiments of the present invention will be described in detail with reference to the accompanying drawings. In the accompanying drawings, it is to be noted that the same reference numerals are used for the same constituent elements. The accompanying drawings are provided to help understanding of the present invention, and thus it is to be noted that the present invention is not limited to the shapes or deployments exemplified in the drawings. Further, detailed description of well-known functions and configurations incorporated herein may be omitted to avoid obscuring the subject matter of the present disclosure. In the following description, it is to be noted that only portions that are necessary to understand the operations according to various embodiments of the present invention will be described, but description of other portions will be omitted to avoid obscuring the subject matter of the present disclosure.

FIG. 1 is a conceptual diagram explaining transmission of a control signal between a base station and a terminal and providing of feedback information thereof in a wireless communication system according to the present invention.

Referring to FIG. 1, a base station 100 may have a communication area of a predetermined range, and may transmit a control signal to a terminal 200 included in the communication range. Further, the base station 100 may notify the terminal 200 of its own area, and may transmit a reference signal for the terminal 200 to confirm the distance and the channel state using a signal quality or signal strength. Based on this, the base station 100 may perform voice and data communication with the terminal 200.

Further, the terminal 200 is a terminal that can perform voice and/or data communication with the base station 100, and may include various types, for example, a smart phone, a tablet computer, a notebook computer, and a portable phone. In the present invention, since the terminal 200 is to receive control information and a reference signal from the base station 100 and to perform feedback, explanation of other portions will be omitted if possible.

Figure 2:
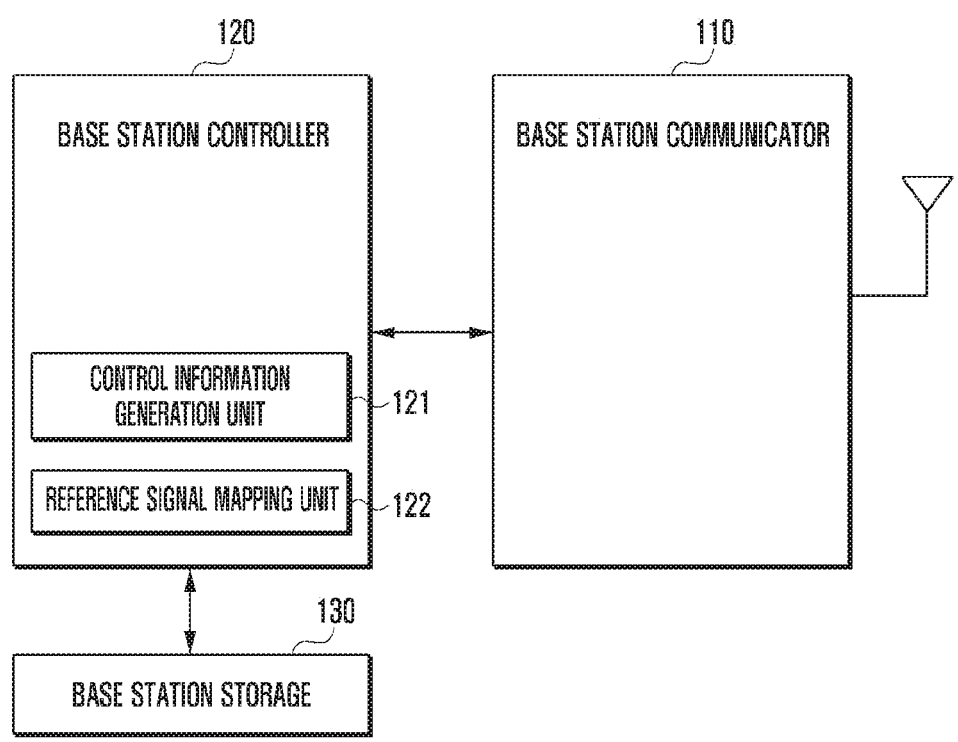
FIG. 2 is a block diagram illustrating the functional configuration of a base station to which the present invention can be applied.

FIG. 2 is a block diagram illustrating the functional configuration of a base station to which the present invention can be applied.

Before referring to FIG. 2, it is to be noted that only configurations for the operation according to the present invention are exemplarily illustrated in the block diagram illustrating the functional configuration of a base station 100. Referring to FIG. 2, the base station 100 may include a base station communicator 110, a base station controller 120, and a base station storage 130. The base station communicator 110 up-converts a signal to be transmitted into a radio band, and performs irradiation or beamforming of the up-converted signal through an antenna, so that the terminal 200 can receive the signal. Further, the base station communicator 110 down-converts the signal received from the antenna, and converts the down-converted signal into a digital signal to provide the converted digital signal to the base station controller 120.

The base station storage 130 may include various kinds of information necessary for control of the base station. For example, the base station storage 130 may store information on a control information generation method and a reference signal mapping method according to the present invention. The information stored in the base station storage 130 as described above may be used for control of the base station controller 120.

The base station controller 120 controls the overall operation of the base station. For example, the base station controller 120 controls channel allocation for performing voice or data communication with a specific terminal and transmission/reception of data through an allocated terminal.

Further, the base station controller 120 may generate control information for measuring a channel state with the terminal 200 according to the present invention, and may control transmission of a reference signal.

The base station controller 120 may include a control information generation unit 121 for generating such control information. The control information generation unit 121 may be a block for indicating the operational function performed by the base station controller 120. Accordingly, the control information generation unit 121 may generate the control information to be used by the terminal 200 for a feedback based on the data stored in the base station storage 130. Further, the base station controller 120 may further include a reference signal mapping unit 122. The reference signal mapping unit 122 may also be a block for indicating the operational function performed by the base station controller 120. Accordingly, the reference signal mapping unit 122 may control generation and mapping of the reference signal for measurement by the terminal 200.

The operation of the base station controller 120 will be described in more detail with reference to the drawings to be described later.

Figure 3:
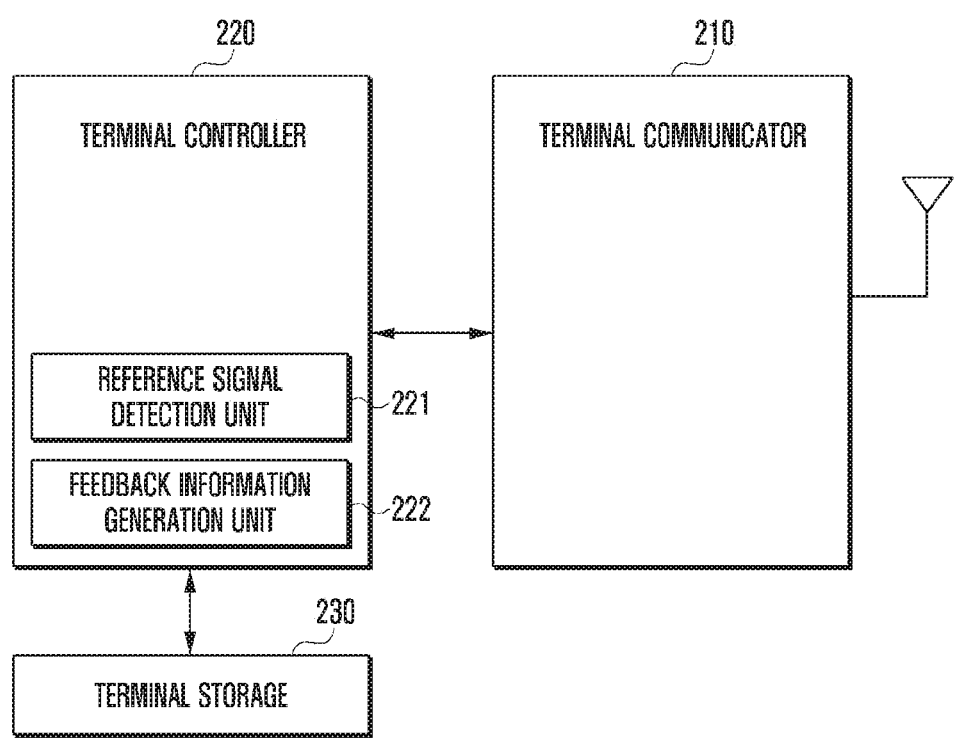
FIG. 3 is a block diagram illustrating the functional configuration of a terminal to which the present invention can be applied.

FIG. 3 is a block diagram illustrating the functional configuration of a terminal to which the present invention can be applied.

Before referring to FIG. 3, it is to be noted that only configurations for the operation according to the present invention are exemplarily illustrated in the block diagram illustrating the functional configuration of a terminal 200 as illustrated in FIG. 3. Referring to FIG. 3, the terminal 200 includes a terminal communicator 210, a terminal controller 220, and a terminal storage 230.

The terminal communicator 210 wirelessly performs voice or data communication with the base station 100 or communication equipment using other communication methods. For example, the terminal communicator 210 may up-convert a signal to be transmitted into a radio band, and irradiate the up-converted signal through an antenna to transmit the signal to the base station 100 or another communication device. Further, the terminal communicator 210 down-converts the signal received from the base station 100 or the other communication device through the antenna into a baseband signal, and converts the down-converted signal into a digital signal to output the converted digital signal.

The terminal storage 230 may have regions for storing data for control of the terminal and data required by a user. The data for the control of the terminal among the data stored in the terminal storage 230 according to the present invention may include a region for storing received control information, a region for storing control data for generating feedback information based on the received control information, and a region for performing data communication. The operation of generating the feedback information through reception of the control information will be described in more detail with reference to the drawing to be described later.

The terminal controller 220 performs the overall control for the operation of the terminal. For example, the terminal controller 220 may perform control operation based on user's requirements or various control operations for communications. In particular, the terminal controller 220 may control reception of the control information and detection of the reference signal, and may also control generation of the feedback information.

Figure 4:
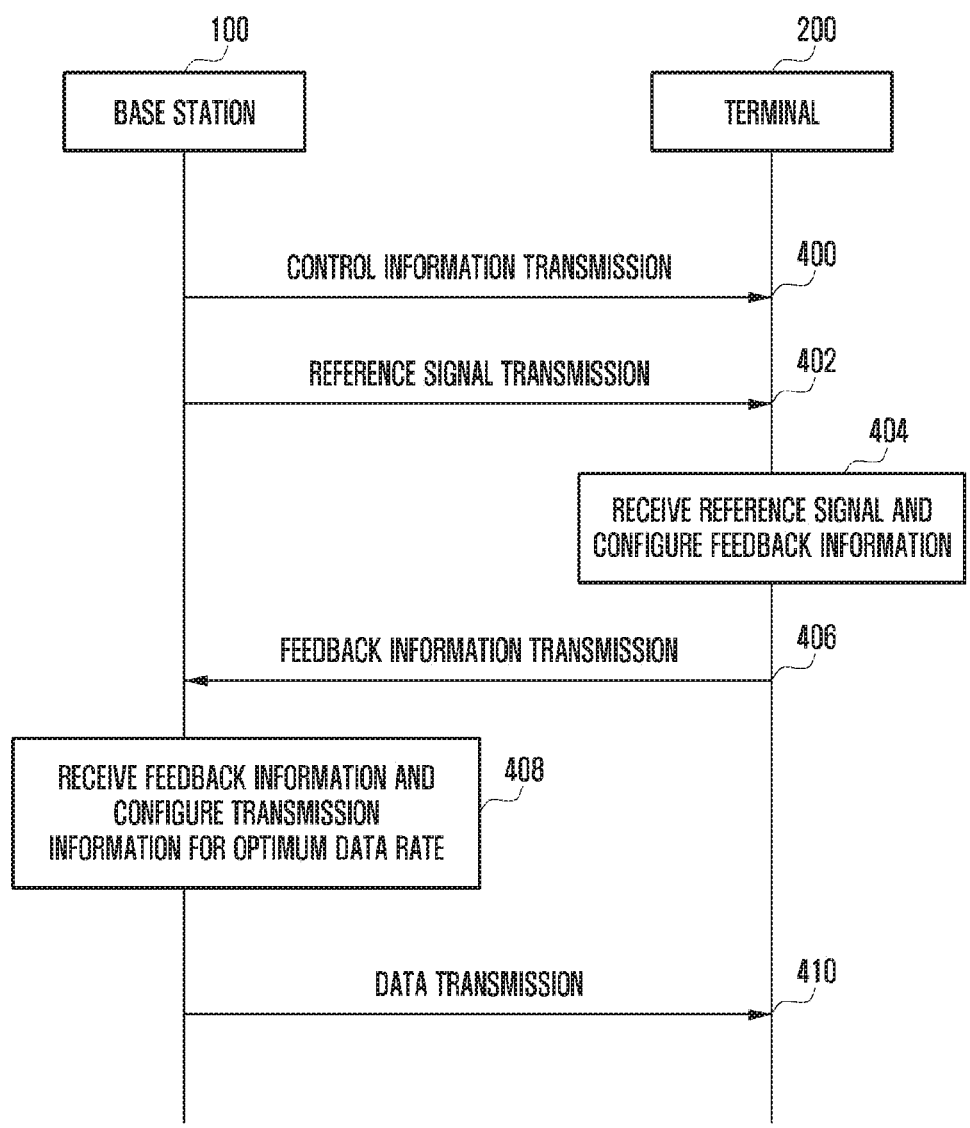
FIG. 4 is a signal flowchart between a base station and a terminal in a wireless communication system according to a preferred embodiment of the present invention.

FIG. 4 is a signal flowchart between a base station and a terminal in a wireless communication system according to a preferred embodiment of the present invention.

Referring to FIG. 4, at operation 400, the base station 100 provides control information to the terminal 200. In this case, the control information provided by the base station 100 may include information indicating a method for configuring system information of the base station and feedback information from the terminal 200. The control information may be generated by the base station controller 120 as described above, and may be transmitted to the terminal 200 through the base station communicator 110. A method for configuring the control information generated by the base station controller 120 and the feedback information will be described in more detail with reference to the drawing to be described later.

Thereafter, at operation 402, the base station 100 transmits a reference signal to the terminal 200. The reference signal may be mapped in a predetermined method in accordance with a wireless communication method to be transmitted. The reference signal mapping method is determined based on the control of the base station controller 120, and the reference signal is transmitted to the terminal through the base station communicator 110.

The terminal 200 may receive the control information transmitted at operation 400 through the terminal communicator 210, and may receive the reference signal transmitted at operation 402 through the terminal communicator 210. Further, at operation 404, the terminal controller 220 of the terminal 200 may configure the feedback information. The feedback information may be configured in a method indicated in the control information provided at operation 400. Further, the terminal controller 220 of the terminal 200 generates the feedback information through measurement of the reference signal received through the terminal communicator 210 at operation 402. This will be described in more detail with reference to the drawings to be described later.

The terminal 200 configures the feedback information through measurement of the reference signal at operation 404, and transmits the generated feedback information to the base station 100 at operation 406. Accordingly, the base station 100 can receive the feedback information generated based on the control information transmitted at operation 400.

Thereafter, at operation 408, the base station 100 may configure data to be transmitted so that the data has an optimum data rate using the feedback information. Thereafter, at operation 410, the base station 100 may transmit the configured data to the terminal 200 to increase data throughput.

Figure 5:
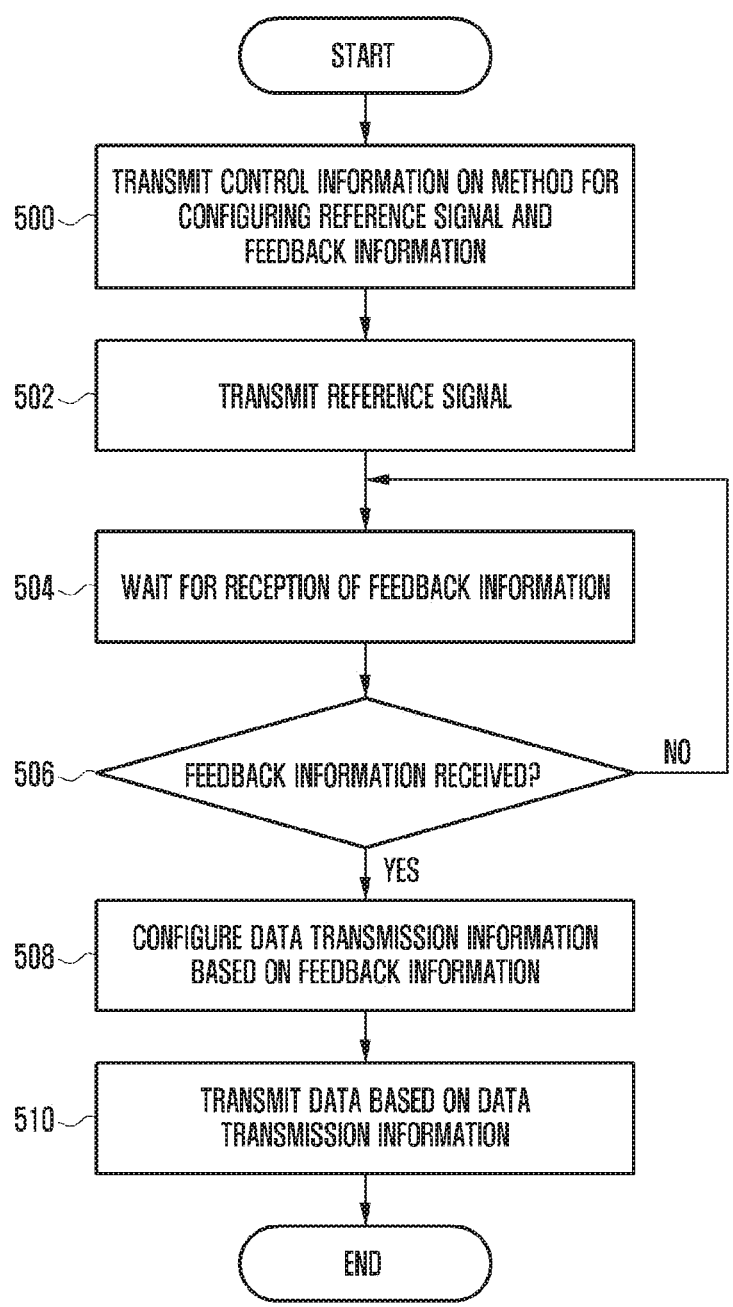
FIG. 5 is a control flowchart explaining the operation of a base station in a wireless communication system according to an embodiment of the present invention.

FIG. 5 is a control flowchart explaining the operation of a base station in a wireless communication system according to an embodiment of the present invention.

At operation 500, the base station controller 120 operates to transmit control information on a method for configuring a reference signal and feedback information. Accordingly, the base station communicator 110 up-converts the generated control information, and performs irradiation or beamforming of the up-converted control information through an antenna to transmit the control information to the terminal. This operation may correspond to the operation 400 of FIG. 4 as described above.

Thereafter, at operation 502, the base station controller 120 operates to transmit the reference signal through mapping of the reference signal in accordance with a predetermined mapping method. Accordingly, the base station communicator 110 may transmit the reference signal to the terminal through the antenna.

After transmitting the control information and the reference signal as described above, the base station controller 120, at operation 504, waits for reception of the feedback information, and proceeds to operation 506 to check whether the feedback information is received. If the feedback information is received as the result of the checking at operation 506, the base station controller 120 proceeds to operation 508, whereas if the feedback information is not received, the base station controller 120 continues to maintain the operation 504.

If the processing proceeds from operation 506 to operation 508, the base station controller 120 configures data transmission information based on the feedback information received from the terminal. Here, the data transmission information may include at least one of a data rate, a beamforming method, and a code rate. Thereafter, at operation 510, the base station controller 120 operates to process and transmit the data to be transmitted based on the data transmission information.

Figure 6:
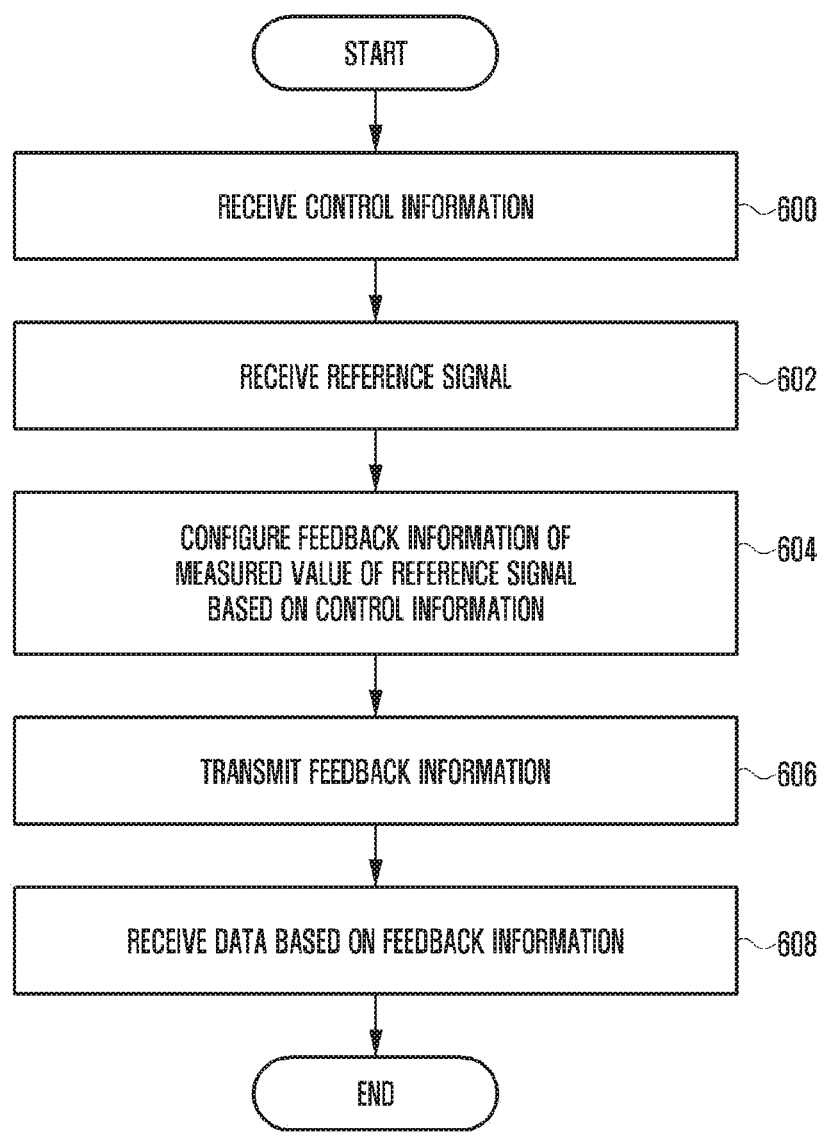
FIG. 6 is a control flowchart explaining the operation of a base station in a wireless communication system according to an embodiment of the present invention.

FIG. 6 is a control flowchart explaining the operation of a base station in a wireless communication system according to an embodiment of the present invention.

At operation 600, the terminal controller 220 receives control information. As described above, the control information may include information indicating a method for configuring system information of the base station and feedback information of the terminal 200. Thereafter, at operation 602, the terminal controller 220 receives a reference signal. As described above, the reference signal may be mapped in a method determined in the system or may be acquired from a specific location or symbol.

If the reference signal is received at operation 602, the terminal controller 220 proceeds to operation 604, and configures information for feedback of a measured value for the reference signal received at operation 602. A method for configuring the information for the feedback at operation 604 will be hereinafter described in more detail.

If the feedback information is configured at operation 604 as described above, the terminal controller 220 proceeds to operation 606 and controls the terminal communicator 210 to transmit the generated feedback information to the base station 100. Thereafter, at operation 608, the terminal controller 220 controls the terminal communicator 210 to receive data based on the feedback information.

Hereinafter, a two-dimensional (2D) antenna to be used in the present invention will be described.

Figure 7A:
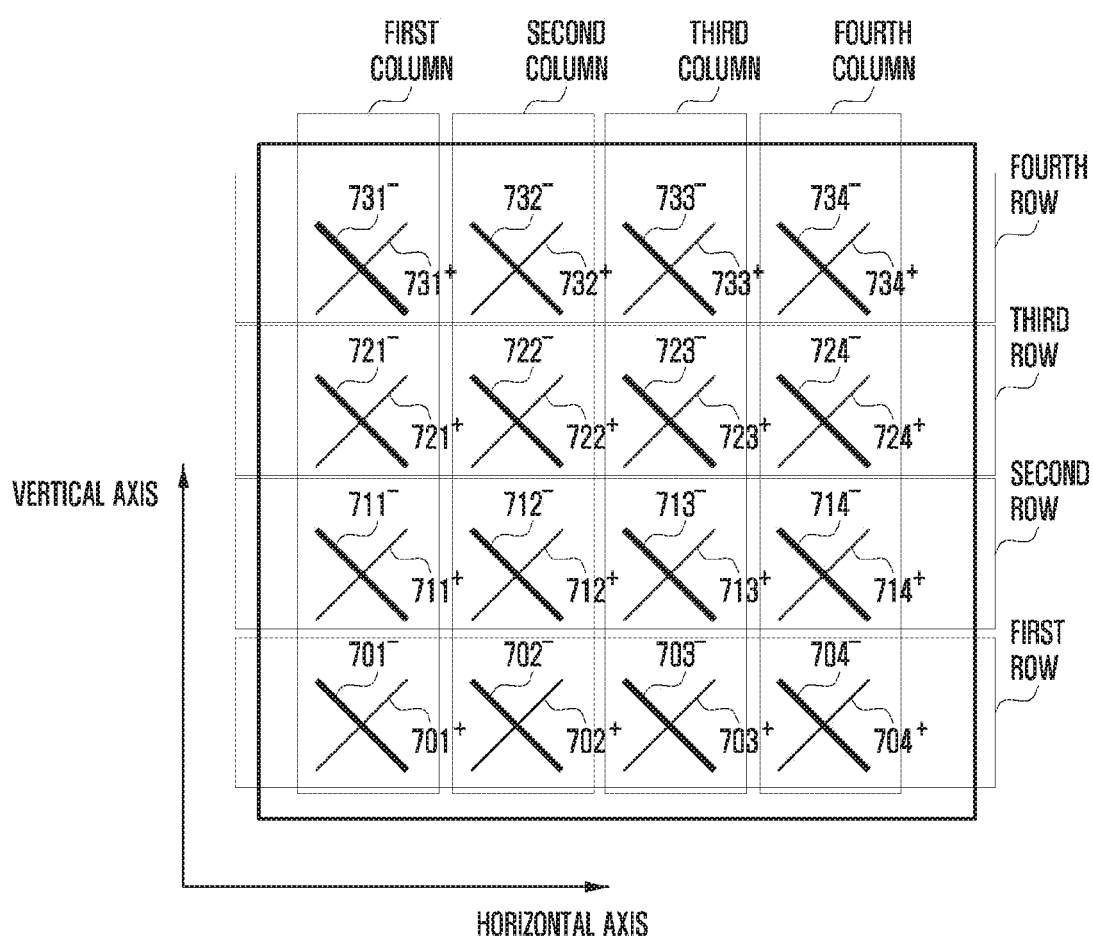
FIG. 7A is a diagram exemplifying the shape of a 2D antenna widely adopted in a base station in a recent communication system.

FIG. 7A is a diagram exemplifying the shape of a 2D antenna widely adopted in a base station in a recent communication system.

Referring to FIG. 7A, each of 2D antennas is configured to have specific directivity with respect to a horizontal axis and a vertical axis. For example, antennas 701⁺ and 701⁻, which firstly cross the first column, will be described.

The antennas 701⁺ and 701⁻, which firstly cross the first column, are arranged to cross each other at right angles, and the antennas that cross each other in the same manner are arranged in a "4×4" form.

More specifically, 16 antennas 701⁺, 702⁺, 703⁺, 704⁺, 711⁺, 712⁺, 713⁺, 714⁺, 721⁺, 722⁺, 723⁺, 724⁺, 731⁺, 732⁺, 733⁺, and 734⁺, which are inclined by 45° in the vertical-axis direction based on the horizontal axis, are arranged in the form of "4×4". That is, four first-row antennas 701⁺, 702⁺, 703⁺, and 704⁺, which are most adjacent to the horizontal axis, second-row antennas 711⁺, 712⁺, 713⁺, and 714⁺, third-row antennas 721⁺, 722⁺, 723⁺, and 724⁺, and fourth-row antennas 731⁺, 732⁺, 733⁺, and 734⁺ are respectively arranged on the horizontal axis. Further, as seen from the vertical axis, first-column antennas 701⁺, 711⁺, 721⁺, and 731⁺, which are most adjacent to the vertical axis, through fourth-column antennas 704⁺, 714⁺, 724⁺, and 734' are respectively arranged on the vertical axis.

Further, 16 antennas 701⁻, 702⁻, 703⁻, 704⁻, 711⁻, 712⁻, 713⁻, 714⁻, 721⁻, 722⁻, 723⁻, 724⁻, 731⁻, 732⁻, 733⁻, and 734⁻, which are inclined by 135° in the vertical-axis direction based on the horizontal axis, are arranged in the form of "4×4". That is, four first-row antennas 701⁻, 702⁻, 703⁻, and 704⁻, which are most adjacent to the horizontal axis, second-row antennas 711⁻, 712⁻, 713⁻, and 714⁻, third-row antennas 72F, 722⁻, 723⁻, and 724⁻, and fourth-row antennas 73F, 732⁻, 733⁻, and 734⁻ are respectively arranged on the horizontal axis. Further, as seen from the vertical axis, first-column antennas 701⁻, 711⁻, 721⁻, and 731⁻, which are most adjacent to the vertical axis, through fourth-column antennas 704⁻, 714⁻, 724⁻, and 734⁻ are respectively arranged on the vertical axis.

Hereinafter, 16 antennas, which are inclined by 45° against the horizontal axis and are arranged in the form of "4×4", may be called "first planar antenna", and 16 antennas, which are inclined by 135° against the horizontal axis and are arranged in the form of "4×4", may be called "second planar antenna". Further, it is exemplified that the number of antennas is 16 to help explanation of the present invention. However, the number of antennas may be smaller than 16 or may be larger than 16. However, it is sufficient that the first planar antenna and the second planar antenna according to the present invention have the 2D arrangement of "N×M".

As exemplified in FIG. 7A, the antenna shape, in which respective antenna elements 701⁺, 702⁺, 703⁺, 704⁺, 711⁺, 712⁺, 713⁺, 714⁺, 721⁺, 722⁺, 723⁺, 724⁺, 731⁺, 732⁺, 733⁺, and 734⁺ of the first planar antenna having the 2D arrangement are arranged to cross respective antenna elements 701⁻, 702⁻, 703⁻, 704⁻, 711⁻, 712⁻, 713⁻, 714⁻, 721⁻, 722⁻, 723⁻, 724⁻, 731⁻, 732⁻, 733⁻, and 734⁻ of the second planar antenna, is called a "cross polarization (X-Pol) antenna". At present, the X-Pol antenna is partially adopted and used in a base station of a wireless communication system.

Figure 7B:
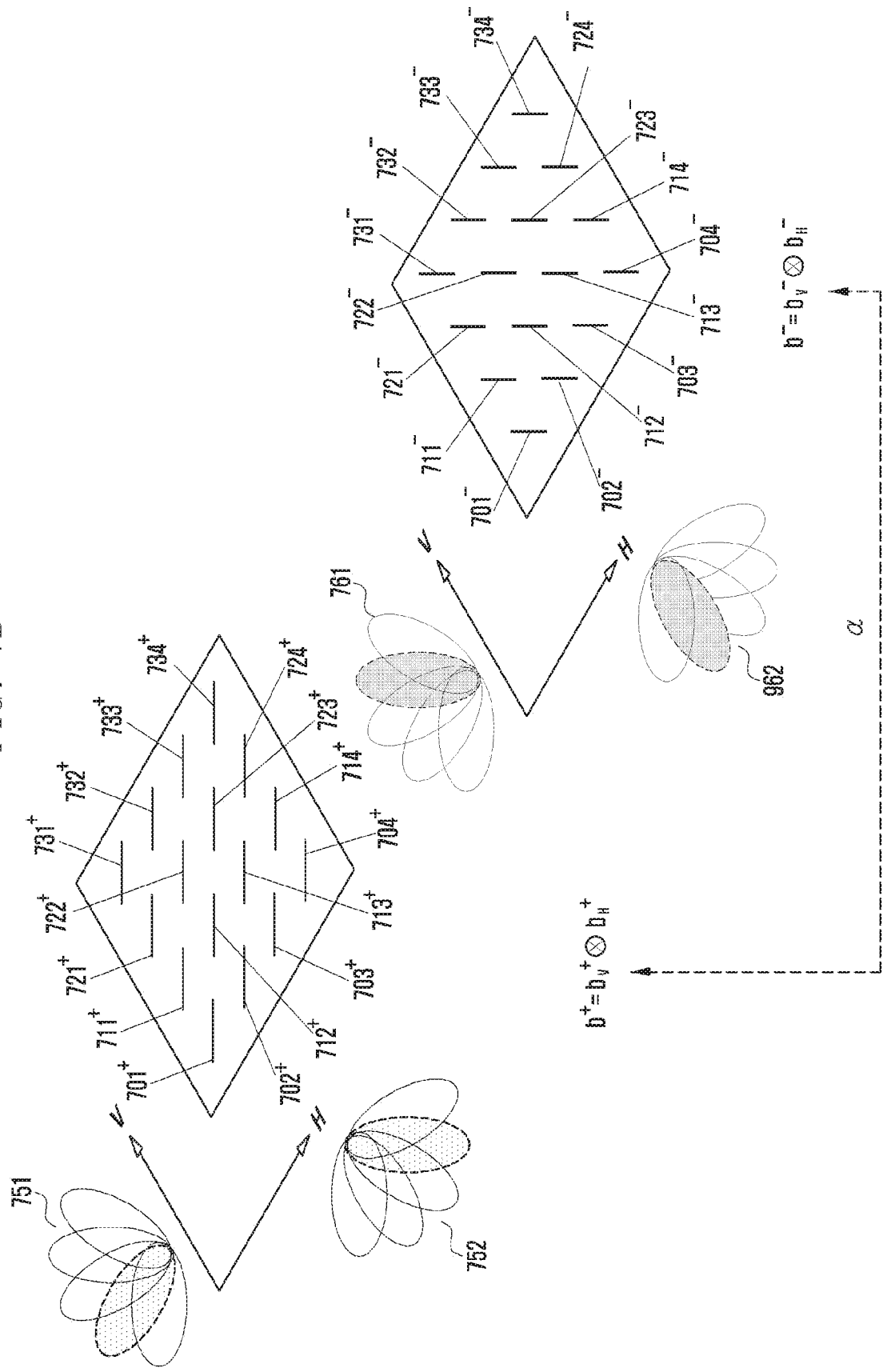
FIG. 7B is a diagram exemplifying an X-Pol antenna separated into respective planar antennas.

FIG. 7B is a diagram exemplifying an X-Pol antenna separated into respective planar antennas.

As exemplified in FIG. 7B, the X-Pol antenna may be used as only the first planar antenna. That is, as denoted by a reference numeral 751 or 752, beamforming may be performed using the first planar antenna. Further, only the second planar antenna may operate as one antenna. That is, beamforming may be performed as denoted by a reference numeral 761 or 762.

As exemplified in FIGS. 7A and 7B, in the case of configuring the X-Pol antenna using the first planar antenna and the second planar antenna, 3D MIMO transmission may become possible. Hereinafter, a method for 3D MIMO transmission using the X-Pol antenna will be described.

3D MIMO Transmission Scheme Using Channel Information of Antennas on Horizontal (H) and Vertical (V) Axes In order to transmit a 3D MIMO signal using an X-Pol antenna having a 2D array structure, channel information is acquired and used for antennas on horizontal (H) and vertical (V) axes for each plane. The operation for using such information will be briefly described as follows.

First, the base station 100 transmits a reference signal corresponding to the channel information of a horizontal (H)-axis antenna and a reference signal corresponding to the channel information of a vertical (V)-axis antenna. Thereafter, the terminal 200 should perform feedback of the channel information corresponding to the respective reference signals designated by the base station 100. In this case, the feedback channel information may include information on a rank indicator (RI), a precoding matrix indicator (PMI), and a channel quality indicator (CQI). At last, the base station 100 may transmit a 3D MIMO signal through combination of the horizontal (H)-axis channel information and the vertical (V)-axis channel information of the respective planar antennas received from the terminal 200. The above-described procedure will be described with reference to FIG. 8A.

Figure 8A:
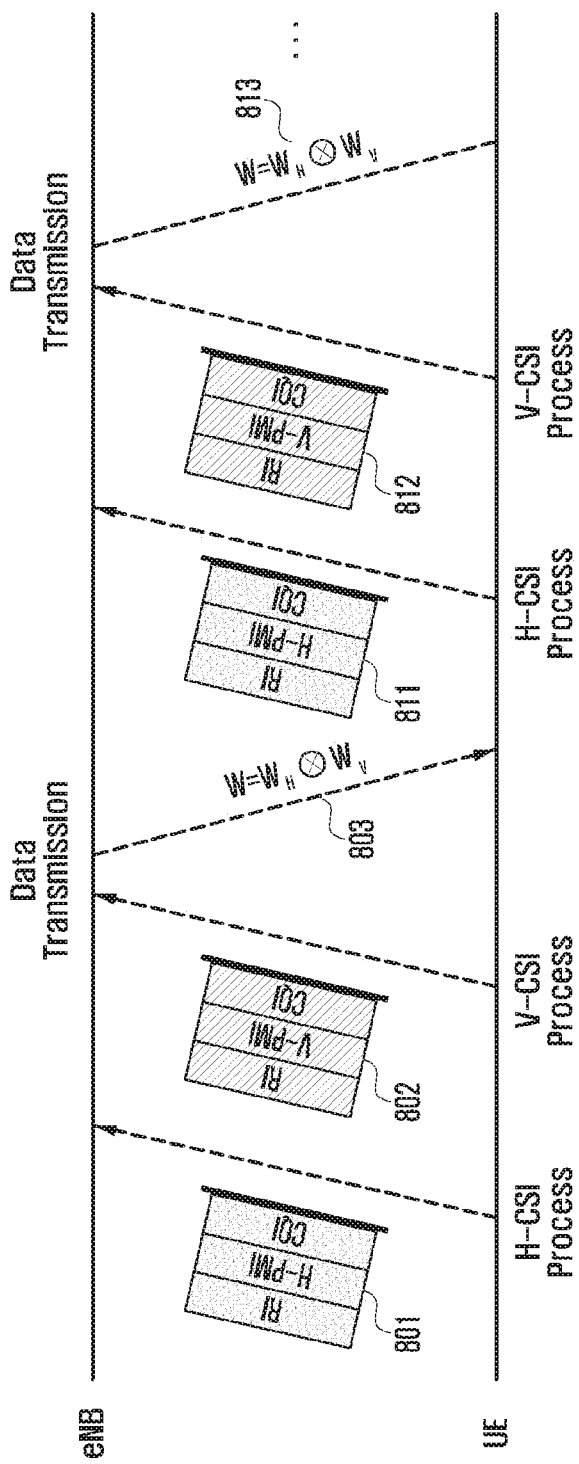
FIG. 8A is a signal flowchart explaining a case where a terminal reports to a base station channel information of a horizontal-axis antenna and a vertical-axis antenna for respective planes and receives data based on this.

FIG. 8A is a signal flowchart explaining a case where a terminal reports to a base station channel information of a horizontal-axis antenna and a vertical-axis antenna for respective planes and receives data based on this.

Before referring to FIG. 8A, a signal flow has been omitted, in which a control signal requested by the base station 100 to generate channel information of a horizontal-axis antenna and channel information of a vertical-axis antenna for each plane is provided to the terminal 200. Further, it is to be noted that an operation has been omitted, in which the base station 100 transmits to the terminal 200 reference signals for measuring the channel information of the horizontal-axis antenna and the vertical-axis antenna for each plane.

Referring to FIG. 8A, at operation 801, the terminal 200 may generate channel quality information of the horizontal-axis antenna to transmit the generated channel quality information to the base station 100, and at operation 802, the terminal 200 may generate channel quality information of the vertical-axis antenna to transmit the generated channel quality information to the base station 100. In this case, as described above, each of the channel quality information of the horizontal-axis antenna and the channel quality information of the vertical-axis antenna may include information on a rank indicator (RI), a precoding matrix indicator (PMI), and a channel quality indicator (CQI).

With respect to the channel quality information of the horizontal-axis antenna and the channel quality information of the vertical-axis antenna as described above, it is not necessary for the terminal 100 to discriminate what plane the reference signal corresponds to That is, it is sufficient that the terminal measures channel qualities on respective axes with respect to different reference signals received from the base station, and generates and transmits the channel quality information corresponding to the measured channel qualities. However, the base station 100 knows the reference signal for the plane transmitted by the base station itself, and if the channel quality information on the horizontal-axis and vertical-axis antennas is received from the terminal 200, the base station 100 can be aware of the plane corresponding to the channel quality information.

Accordingly, at operation 803, the base station 100 can transmit data to the terminal 200 using the channel quality information of the horizontal-axis antenna and the channel quality information of the vertical-axis antenna for one specific plane or both two planes received at operations 801 and 802. Here, in the case of transmitting the data at operation 803, the base station 100 may perform Kronecker product (KP) operation with respect to information on the horizontal and vertical axes to transmit the data. In this case, if it is assumed that the data rate acquired using the channel information on the horizontal axis is $W_H$, and the data rate acquired using the channel information on the vertical axis is $W_V$, the KP operation may be expressed as in mathematical expression 1 below.

$$W = W_H \otimes W_V \qquad \text{[Mathematical Expression 1]}$$

In the mathematical expression 1, ⊗ means Kronecker product (KP) operation.

Thereafter, operations 811 and 812 correspond to the operations 801 and 802, and operation 813 corresponds to the operation 803. Accordingly, an additional explanation of the same operation will be omitted.

In summary, as described above, the terminal 200 measures the reference signals using the vertical and horizontal axes with respect to the planar antennas, generates the channel quality information corresponding to the measured reference signals, and reports this to the base station 100. Further, the base station 100 may transmit the data to the terminal 200 using the channel quality information reported from the terminal 200.

On the other hand, FIG. 8A exemplifies a case where the channel quality information of the horizontal-axis antenna and the channel quality information of the vertical-axis antenna are respectively configured to be reported. However, the channel quality information of the horizontal-axis antenna and the channel quality information of the vertical-axis antenna may be reported at a time.

Figure 8B:
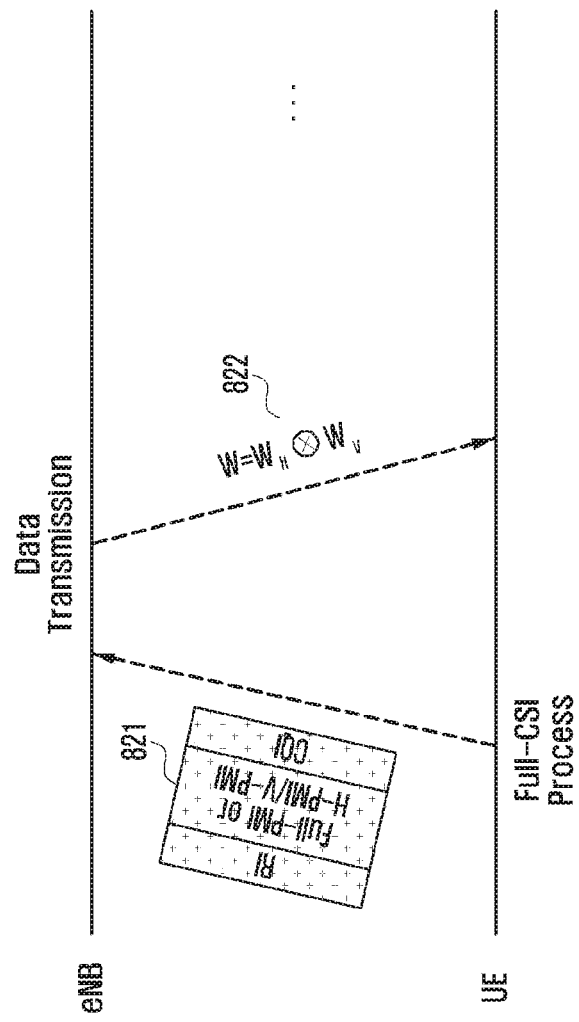
FIG. 8B is a signal flowchart explaining a case where a terminal reports to a base station channel information of a horizontal-axis antenna and a vertical-axis antenna at a time and receives data based on this.

FIG. 8B is a signal flowchart explaining a case where a terminal reports to a base station channel information of a horizontal-axis antenna and a vertical-axis antenna at a time and receives data based on this.

Before referring to FIG. 8B, a signal flow has been omitted, in which a control signal requested by the base station 100 to generate channel information of a horizontal-axis antenna and channel information of a vertical-axis antenna for each plane and information for instructing to report channel quality information of the respective antennas at a time are provided to the terminal 200. Further, it is to be noted that an operation has been omitted, in which the base station 100 transmits to the terminal 200 reference signals for measuring the channel information of the horizontal-axis antenna and the vertical-axis antenna for each plane.

Referring to FIG. 8B, at operation 821, the terminal 200 may generate channel quality information of the horizontal-axis antenna and channel quality information of the vertical-axis antenna at a time to transmit them to the base station 100. In this case, as described above, the channel quality information of the horizontal-axis or vertical-axis antenna may include information on a rank indicator (RI), a precoding matrix indicator (PMI), and a channel quality indicator (CQI). Here, the precoding matrix indicator (PMI) may report the whole PMI value for the horizontal-axis antenna and the vertical-axis antenna, or respective PMI values for the horizontal-axis antenna and the vertical-axis antenna.

In the case where the terminal 200 provides one precoding matrix indicator (PMI) with respect to different axes, the PMI may be divided in horizontal (H) and vertical (V) directions (in the case of reporting the respective PMIs), or may include information directly indicating the 3D direction, and the RI and CQI information may not be divided in H and V directions, but may become the RI and CQI corresponding to the information indicating the 3D direction.

Accordingly, at operation 822, the base station 100 may transmit the data to the terminal 200 using the channel quality information on the horizontal axis of the antenna and the channel quality information on the vertical axis of the antenna. In this case, information on the data rate may be configured as in the mathematical expression 1 as described above.

In summary, as described above, the terminal 200 generates the respective channel quality information through measurement of the reference signals for the vertical and horizontal axes on a specific plane, and reports the generated channel quality information to the base station 100 at a time. Further, the base station 100 may transmit the data to the terminal 200 using the respective channel quality information reported from the terminal 200. In this case, the base station 100 with respect to the terminal 200 using the received information.

Hereinafter, the operation for using the above-described method will be described in more detail.

(1) CSI Process and Feedback Information Configuration

According to the present invention, a method for using a cross polarization (X-Pol) antenna having a 2D array structure as described above with reference to FIG. 7A is used.

As briefly described above, the present invention aims at the point where channels between different cross polarization (X-Pol) antennas differ from each other. That is, feedback is performed through separation of respective channel information of horizontal/vertical-axis antennas by polarizations. Further, based on this, a transmission scheme for determining a 3D MIMO transmission direction and an operation scenario are proposed. That is, as described above with reference to FIG. 7A or 7B, the arrangement of the first-row antennas (701⁺, 702⁺, 703⁺, 704⁺) adjacent to the horizontal axis is different from the arrangement of the first-column antennas (701⁺, 711⁺, 721⁺, 731⁺) adjacent to the vertical axis, which are included in one specific planar antenna, for example, the first planar antenna, and thus the 3D beamforming can be performed using separation and feedback of the information of the respective antennas. Now, correlation between respective axis antennas, channel quality information configuration of respective planar antennas, and data transmission using them will be described in more detail.

Hereinafter, three kinds of points below will be mainly described.

Schemes for (1) the configuration of control information to be transmitted, (2) structure of a transmitted reference signal, and (3) configuration of feedback information will be described in more detail.

(1-1) Feedback Scheme for Channel Information on Horizontal (H)/Vertical (V)-Axis Antennas by Polarizations Configuration of control information to be transmitted from the base station 100 to the terminal 200 according to the present invention is as follows. First, for an operation according to the present invention, the base station 100 should transmit the following control information to the terminal 200.

1) In a CSI process, a reference signal for channel estimation of a horizontal-axis antenna and a reference signal for channel estimation of a vertical-axis antenna should be included. Further, PMIS that correspond to the corresponding CSI process should be obtained using a specific operation, for example, a Kronecker product (KP) operation, with respect to such information. In the following description, it is assumed that the PMI for the first planar antenna is denoted by "r", and the PMI for the second planar antenna is denoted by "f". In the case of measuring and reporting the PMI for the horizontal axis and the PMI for the vertical axis, the PMI $f^+$ for the first planar antenna may be generated as in mathematical expression 2 below at the n-th report time, and thereafter, the PMI f for the second planar antenna may be generated as in mathematical expression 3 below at the (n+1)-th report time.

$$f^+ = b_H^{+(n)} \otimes b_V^{+(n)} \qquad \text{[Mathematical Expression 2]}$$

$$f^- = b_H^{-(n+1)} \otimes b_V^{-(n+1)} \qquad \text{[Mathematical Expression 3]}$$

In the mathematical expressions 2 and 3, $b_H$ is a PMI value for the horizontal axis in one specific planar antenna, and by is a PMI value for the vertical axis in one specific planar antenna. Accordingly, if the order is not considered, that is, if the order, such as the n-th or (n+1)-th, is not considered, $b_H^+$ is a PMI for the horizontal axis in the first planar antenna, $b_V^+$ is a PMI for the horizontal axis in the first planar antenna, $b_H^-$ is a PMI for the horizontal axis in the second planar antenna, and $b_V^-$ is a PMI for the vertical axis in the second planar antenna.

2) Next, one final PMI is configured by tying PMIS obtained through two CSI processes divided by polarizations. In this case, co-phase information between the PMIS obtained through the respective CSI processes may be additionally obtained to be applied to the final PMI. Here, if it is assumed that a denotes co-phases, a may be expressed as in mathematical expression 4 below.

$$\alpha = \operatorname{argmax} f(Hf) \quad \text{[Mathematical Expression 4]}$$

Here, arg max means a co-phase value that makes f( ) maximum among usable co-phase values, and f(·) is a function for selecting the PMI, and a channel capacity equation or a channel gain level may be used as the function.

3) The CQI is calculated based on the final PMI determined by the above-described method.

4) The above-described process is applied in the same manner even for rank 2 transmission.

The control information that the base station 100 provides to the terminal 200 may be provided as a whole, or only a part thereof may be directly transmitted from the base station 100 to the terminal 200 while the remaining part may be pre-engaged to be performed.

Next, the structure of a reference signal that the base station transmits to the terminal will be described.

For the present invention, the base station 100 may transmit a reference signal corresponding to the first planar antenna, that is, (+) polarization antenna, in the first CSI process (CSI process #1), and may transmit a referent signal corresponding to the second planar antenna, that is, (−) polarization antenna, in the second CSI process (CSI process #2). Here, the order of transmitting the reference signal for the first planar antenna and the reference signal for the second planar antenna is not important, and it is sufficient that the reference signals are alternately transmitted. Further, in the respective CSI processes, reference signals for measurement of the horizontal (H)/vertical (V)-axis channel information are transmitted.

Next, a scheme in which the terminal 200 receives the above-described control information, and configures information for feedback to the base station 100 through measurement of the reference signals for the respective planar antennas will be described.

1) The terminal 200 receives a plurality of CSI processes (that are divided by polarizations, but may not be recognized by the terminal).

2) The terminal 200 calculates horizontal (H)/vertical (V)-axis channel information corresponding to the (+) polarization antenna using the reference signal transmitted in the first CSI process (CSI process #1). Such calculation may be performed in the method as expressed in the mathematical expressions 2 and 3 as described above. Next, even in the second CSI process (CSI process #2), the terminal calculates horizontal (H)/vertical (V)-axis channel information corresponding to the (−) polarization. In this case, the channel information calculated in the first and second CSI processes may include RI, PMI, and CQI.

3) Additional channel information is calculated through combination of the channel information calculated in CSI process #1 and CSI process #2. For example, the co-phase value between different polarization channels may be calculated through combination of the channel information obtained in two CSI processes. This may be calculated as in the mathematical expression 4 as described above. Further, additional RI and CQI may be acquired (or calculated) through combination of the channel information acquired in the two CSI processes.

Figure 9:
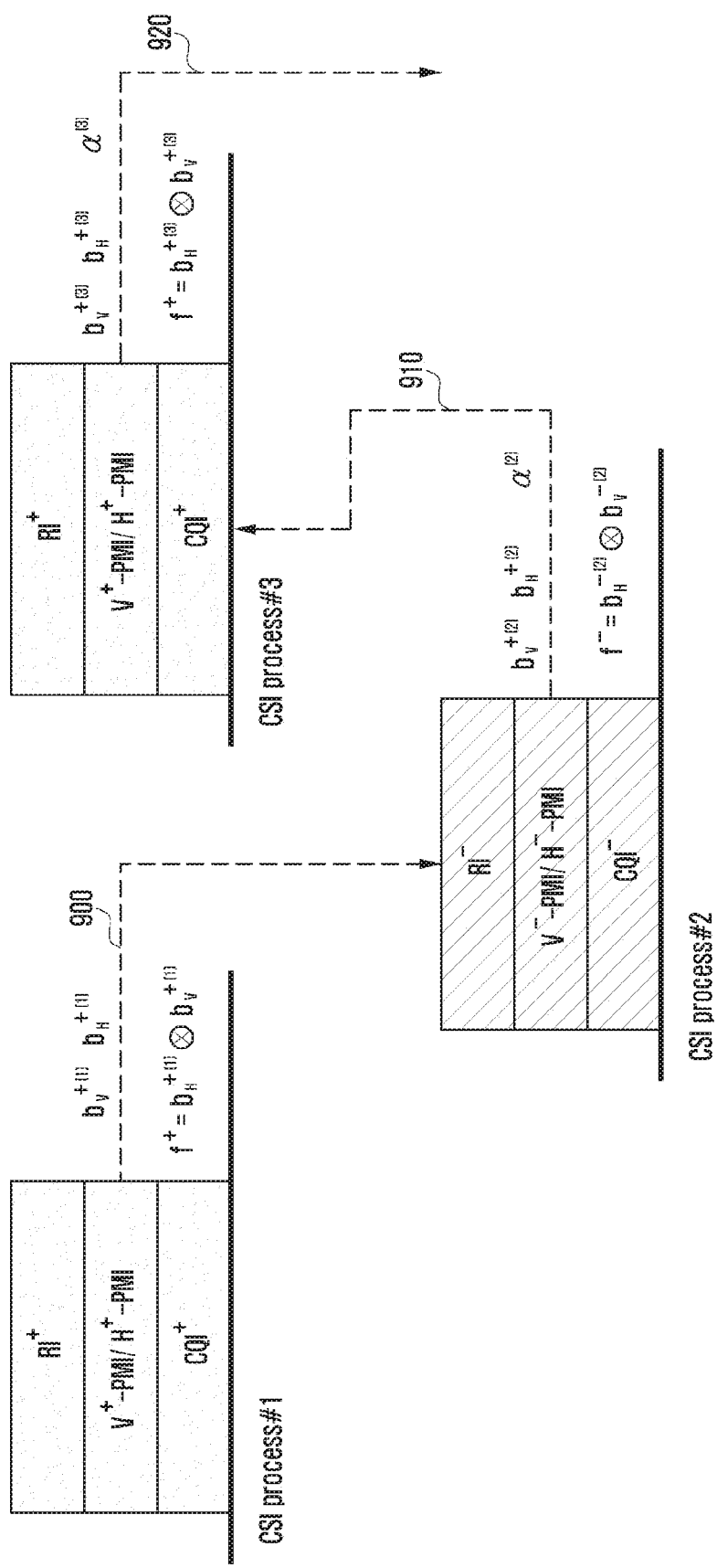
FIG. 9 is a conceptual diagram explaining feedback of channel information of horizontal and vertical axes for each planar antenna (polarization) according to the present invention.

Above-described operation will be described in detail with reference to FIG. 9. FIG. 9 is a conceptual diagram explaining feedback of channel information of horizontal and vertical axes for each planar antenna (polarization) according to the present invention.

As illustrated in FIG. 9, the CSI process may be performed in two stages. In FIG. 9, $RI^+$, $VI^+$-PMI, $H^+$-PMI, and $CQI^+$ may be information that can be acquired through measurement of the reference signal transmitted through the first planar antenna. Further, in FIG. 9, $RI^-$, $V^-$-PMI, $H^-$-PMI, and $CQI^-$ may be information that can be acquired through measurement of the reference signal transmitted through the second planar antenna.

Accordingly, in the first process, the terminal 200 may generate the information as expressed in the mathematical expression 2 as described above, and may provide the generated information to the base station 100 at operation 900. Further, in the second process, the terminal 200 may generate the information as expressed in the mathematical expression 3 as described above, and may provide the generated information to the base station 100 at operation 910.

In this case, since the information previously calculated in the first CSI process is provided in the second CSI process, the information as expressed in the mathematical expression 4 as described above can be generated. In this case, the information in the mathematical expression 4 may be respectively calculated by the base station 100 and the terminal 200, or may be calculated by the terminal 200 to be provided to the base station 100. Further, since the information previously calculated in the second CSI process is provided in the third CSI process, the information as expressed in the mathematical expression 4 as described above can be generated at operation 920. In addition to the mathematical expression 4 as described above, the terminal may combine and provide plural pieces of CSI process information even with respect to the channel information, such as rank information and CQI information, required by the base station.

In the embodiment of FIG. 9 as described above, as exemplified in the drawing, the RI, PMI, and CQI information may be used in all for each CSI process.

(1-2) Scheme for Configuring CSI Processes by Horizontal (H) and Vertical (V) Axes In the second embodiment, a scheme for configuring CSI processes by vertical and horizontal axes will be described. Even in this case, the base station 100 should provide control information below to the terminal.

1) It is necessary to notify the terminal 200 that a reference signal for estimating channel information that is divided into the first and second planar antennas, that is, (+)/(−) polarizations is included in the CSI process. Accordingly, the terminal may obtain a PMI corresponding to the CSI process through separation or combination of channels by polarizations. That is, the whole PMI may be calculated through calculation of a horizontal (H)-axis PMI calculated with respect to (+) polarization that corresponds to the first planar antenna and a horizontal (H)-axis PMI calculated with respect to (−) polarization that corresponds to the second planar antenna. In this case, the whole PMI $b_H$ may be calculated as expressed in mathematical expression 5 below.

$$B_H=[b_H{}^+ b_H{}^-]^T \qquad \text{[Mathematical Expression 5]}$$

In the mathematical expression 5, $b_H{}^+$ means a PMI for the horizontal axis in the first planar antenna, and $b_H{}^-$ means a PMI for the horizontal axis in the second planar antenna. Further, $[\cdot]^T$ means an operation for changing rows and columns of a matrix.

Further, in the second CSI process, the whole PMI may be calculated through calculation of a vertical (V)-axis PMI calculated with respect to (+) polarization that corresponds to the first planar antenna and a vertical (V)-axis PMI calculated with respect to (−) polarization that corresponds to the second planar antenna. In this case, the whole PMI by may be calculated as expressed in mathematical expression 6 below.

$$B_V=[b_V{}^+ b_V{}^-]^T \qquad \text{[Mathematical Expression 6]}$$

In the mathematical expression 6, $b_V{}^+$ means a PMI for the vertical axis in the first planar antenna, and $b_V{}^-$ means a PMI for the vertical axis in the second planar antenna.

As described above, one final PMI may be configured by tying PMIS obtained through two CSI processes divided on the horizontal axis and the vertical axis. In this case, the final PMI may be calculated through application of KP operation with respect to the horizontal (H)/vertical (V)-axis PMI information corresponding to the respective polarizations. Further, the co-phase value between the polarizations may be additionally applied to the final PMI. In this case, the co-phase value between the polarizations applied to the final PMI may be calculated as expressed in the mathematical expression 4 as described above.

Thereafter, the CQI may be calculated based on the calculated final PMI. The above-described process is applied in the same manner even for rank 2 transmission.

Further, the above-described control information may be provided to the terminal 200 as a whole, or only a part of the control information may be to the terminal 200 while the remaining control information may be pre-engaged to be performed.

Next, the structure of a reference signal that the base station 100 transmits to the terminal after transmitting the control information as described above will be described.

According to the second embodiment of the present invention, the base station 100 may transmit a reference signal corresponding to the horizontal-axis antenna in the first CSI process, and may transmit a referent signal corresponding to the vertical-axis antenna in the second CSI process. Further, the reference signal may be transmitted through changing of the respective planar antennas, that is, polarizations. In the respective CSI processes, the reference signals for measurement of the horizontal (H)/vertical (V)-axis channel information are transmitted.

Next, a method for the terminal 200 that has received the control information and the reference signals as described above to configure feedback information will be described.

The terminal 200 receives a plurality of CSI processes (that are divided on the H/V axes, but may not be recognized by the terminal). Further, the terminal 200 calculates the channel information corresponding to the horizontal (H)-axis antenna using the reference signal transmitted in the first CSI process. As described above, the calculated information may include RI, PMI, and CQI. Next, the terminal 200 calculates the channel information corresponding to the vertical (V)-axis antenna in the second CSI process.

Thereafter, the terminal 200 calculates additional channel information through combination of the channel information calculated in the first and second CSI processes. For example, the terminal may calculate the channel value in consideration of the respective planar antennas, that is, polarizations, through combination of the channel information obtained in the two CSI processes, and may additionally calculate the co-phase value between different polarization channels. Further, the terminal 200 may obtain additional RI and CQI through combination of the channel information obtained in the two CSI processes. Accordingly, the terminal 200 may perform feedback of the information to the base station 100.

Then, the above-described operation will be described with reference to accompanying FIG. 10.

Figure 10:
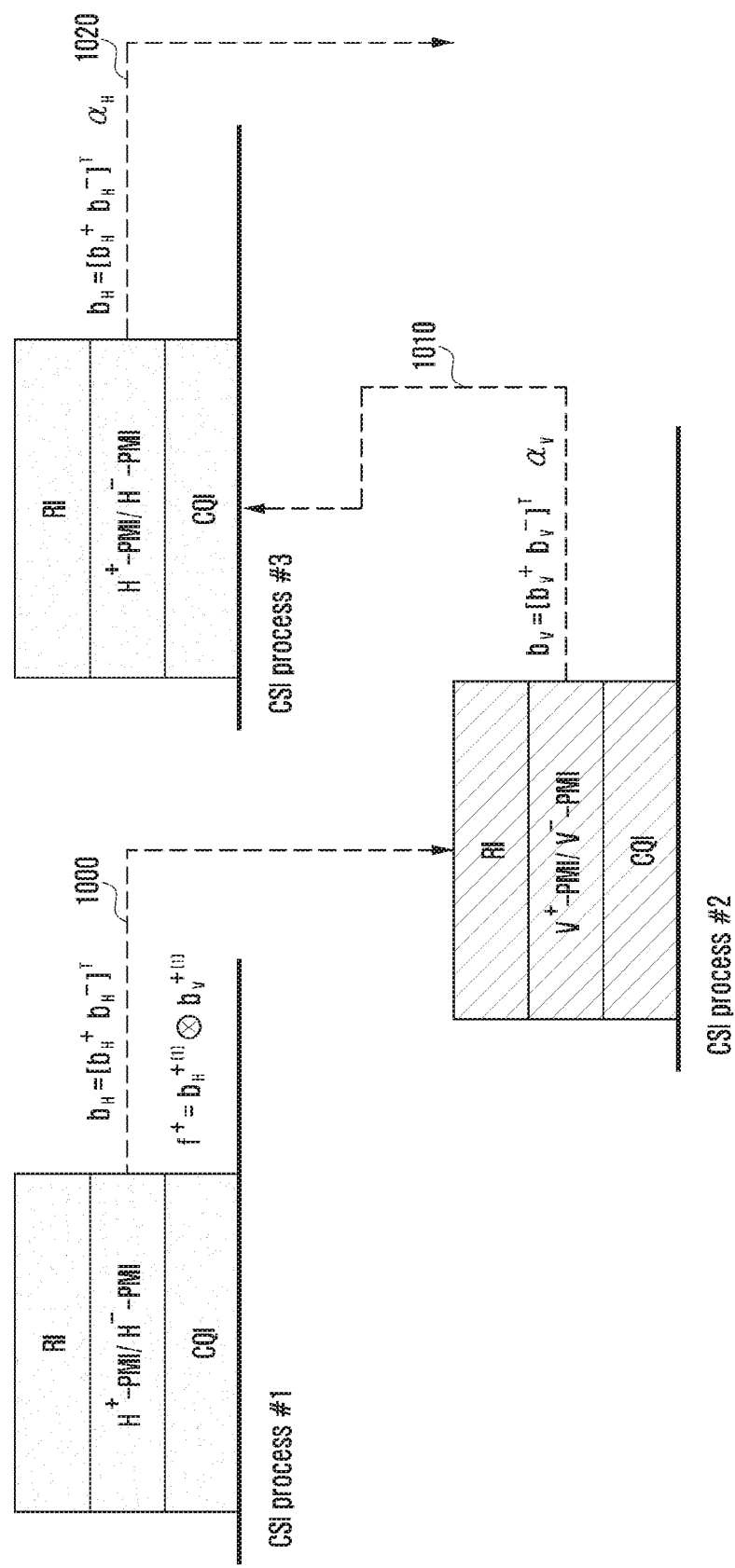
FIG. 10 is a conceptual diagram explaining feedback of channel information for each of a horizontal-axis antenna and a vertical-axis antenna according to an embodiment of the present invention.

FIG. 10 is a conceptual diagram explaining feedback of channel information for each of a horizontal-axis antenna and a vertical-axis antenna according to an embodiment of the present invention.

As illustrated in FIG. 10, the CSI process may be performed in two stages. In FIG. 10, $H^+$-PMI and $H^-$-PMI are PMI values for the horizontal axes of the first and second planar antennas, and $V^+$-PMI and $V^-$-PMI are PMI values for the vertical axes of the first and second planar antennas.

First, at operation 1000, the terminal 200 performs a first CSI process in which the terminal generates information including PMI values for the horizontal axes of the first and second planar antennas, RI, and CQI and reports the generated information to the base station 100. In this case, the final PMI for the horizontal axes of the first and second planar antennas may be calculated as expressed in the mathematical expression 5 as described above.

Further, at operation 1010, the terminal 200 performs a second CSI process in which the terminal generates information including PMI values for the vertical axes of the first and second planar antennas, RI, and CQI and reports the generated information to the base station 100. In this case, the final PMI for the vertical axes of the first and second planar antennas may be calculated as expressed in the mathematical expression 6 as described above. Further, since the first CSI has been performed, the terminal can calculate a correlation value in the case of performing the second CSI process. The correlation value may be calculated as expressed in the mathematical expression 4 as described above.

Thereafter, at operation 1020, the terminal 200 may perform a third CSI process and the subsequent CSI process in the same method as the second CSI process as described above.

(1-3) Method for Configuring CSI Processes by Horizontal (H)/Vertical (V)-Axis Planar Antennas (Polarizations)

Next, a method for configuring CSI processes by horizontal (H)/vertical (V)-axis planar antennas will be described. Even in the case of performing the CSI processes by the horizontal (H)/vertical (V)-axis planar antennas, the base station 100 should provide control information below to the terminal 200, so that the terminal 200 performs the CSI processes.

Now, the control information to be transmitted from the base station 100 to the terminal 200 will be described.

The base station 100 may notify the terminal 200 that reference signals for estimating the channel information for the vertical and horizontal axes with respect to the first and second planar antennas are included in the CSI process to be transmitted. Then, the terminal 200 may acquire PMIS for respective CSI processes and provide the acquired PMIS to the base station. In this case, it is defined that the PMI acquired from the horizontal-axis reference signal for the first planar antenna is called H⁺-PMI, the PMI acquired from the vertical-axis reference signal for the first planar antenna is called V⁺-PMI, the PMI acquired from the horizontal-axis reference signal for the second planar antenna is called H⁻-PMI, and the PMI acquired from the vertical-axis reference signal for the second planar antenna is called V⁻-PMI.

Then, the terminal 200 may acquire the PMI acquired from the horizontal-axis reference signal for the first planar antenna (H⁺-PMI) in the first CSI process to transmit the acquired H⁺-PMI to the base station together with RI and CQI, and may acquire the PMI acquired from the vertical-axis reference signal for the first planar antenna (V⁺-PMI) in the second CSI process to transmit the acquired V⁺-PMI to the base station together with RI and CQI. Further, the terminal 200 may acquire one final PMI through performing KP operation of information acquired with respect to the first planar antenna.

Further, the terminal 200 may acquire the PMI acquired from the horizontal-axis reference signal for the second planar antenna (H⁻-PMI) in the third CSI process to transmit the acquired H⁻-PMI to the base station together with RI and CQI, and may acquire the PMI acquired from the vertical-axis reference signal for the second planar antenna (V⁻-PMI) in the fourth CSI process to transmit the acquired V⁻-PMI to the base station together with RI and CQI. Further, the terminal 200 may acquire one final PMI through performing KP operation of information acquired with respect to the second planar antenna.

In summary, as described above, the terminal 200 may calculate the final PMI through performing the KP operation of the PMI information corresponding to the horizontal (H)/vertical (V) axes corresponding to the respective planar antennas, that is, respective polarizations. Further, during calculation of the final PMI, the terminal 200 may calculate the final PMI using the first and third CSI processes. Accordingly, the base station 100 should pre-notify the terminal 200 what CSI processes the one final PMI is to be calculated through.

Further, in the process of obtaining the final PMI as calculated above, a co-phase value that is a correlation value between planar antennas may be additionally applied, and the CQI may be calculated based on the final PMI. The above-described operation may be applied in the same manner even for rank 2 transmission.

Further, the control information that the base station 100 provides to the terminal 200 may be provided as a whole, or only a part of the control information may be transmitted to the terminal 200 while the remaining control information may be pre-engaged to be performed.

Next, the structure of a reference signal that the base station 100 transmits to the terminal 200 will be described. In order to perform the present invention, the base station 100 may transmit a reference signal corresponding to the horizontal (H⁺)-axis antenna for the first planar antenna in the first CSI process, and may transmit a reference signal corresponding to the horizontal (H⁻)-axis antenna for the second planar antenna in the second CSI process. Further, the base station 100 may transmit a reference signal corresponding to the vertical (V⁺)-axis antenna for the first planar antenna in the third CSI process, and may transmit a reference signal corresponding to the vertical (V⁻)-axis antenna for the second planar antenna in the fourth CSI process. As described above, the base station 100 may change the order of transmitting the reference signals by CSI processes.

As described above, in the case where the base station 100 transmits the reference signals by CSI processes, the terminal 200 generates feedback information by CSI processes to provide the generated feedback information to the base station 100. Such feedback will be described in more detail.

The terminal 200 receives control information to perform a plurality of CSI processes (that are divided into H/V axes and polarizations, but may not be recognized by the terminal). Then, the terminal 200 calculates the channel information corresponding to the horizontal (H⁺)-axis antenna for the first planar antenna using the reference signal transmitted in the first CSI process (CSI process #1). In this case, the calculated information may include RI, PMI, and CQI. Thereafter, the terminal 200 calculates the channel information corresponding to the horizontal (H⁻)-axis antenna for the second planar antenna using the reference signal transmitted in the second CSI process (CSI process #2). Even in this case, the calculated information may include RI, PMI, and CQI.

Further, the terminal 200 calculates the channel information corresponding to the vertical (V⁺)-axis antenna for the first planar antenna using the reference signal transmitted in the third CSI process (CSI process #3). In this case, the calculated information may include RI, PMI, and CQI. Lastly, the terminal 200 calculates the channel information corresponding to the vertical (V⁻)-axis antenna using the reference signal transmitted in the fourth CSI process (CSI process 111). Even in this case, the calculated information may include RI, PMI, and CQI.

As described above, additional channel information is calculated through combination of the channel information calculated through four CSI processes (CSI process #1 to #4). For example, channel values in consideration of the respective planar antennas (polarizations) may be calculated through combination of the channel information obtained in the four CSI processes, and may additionally calculate the co-phase value that is the correlation value with different planar antennas (polarizations). Further, additional RI and CQI may be obtained through combination of the channel information obtained in the four CSI processes.

The above-described operation will be described in detail with reference to FIG. 11.

Figure 11:
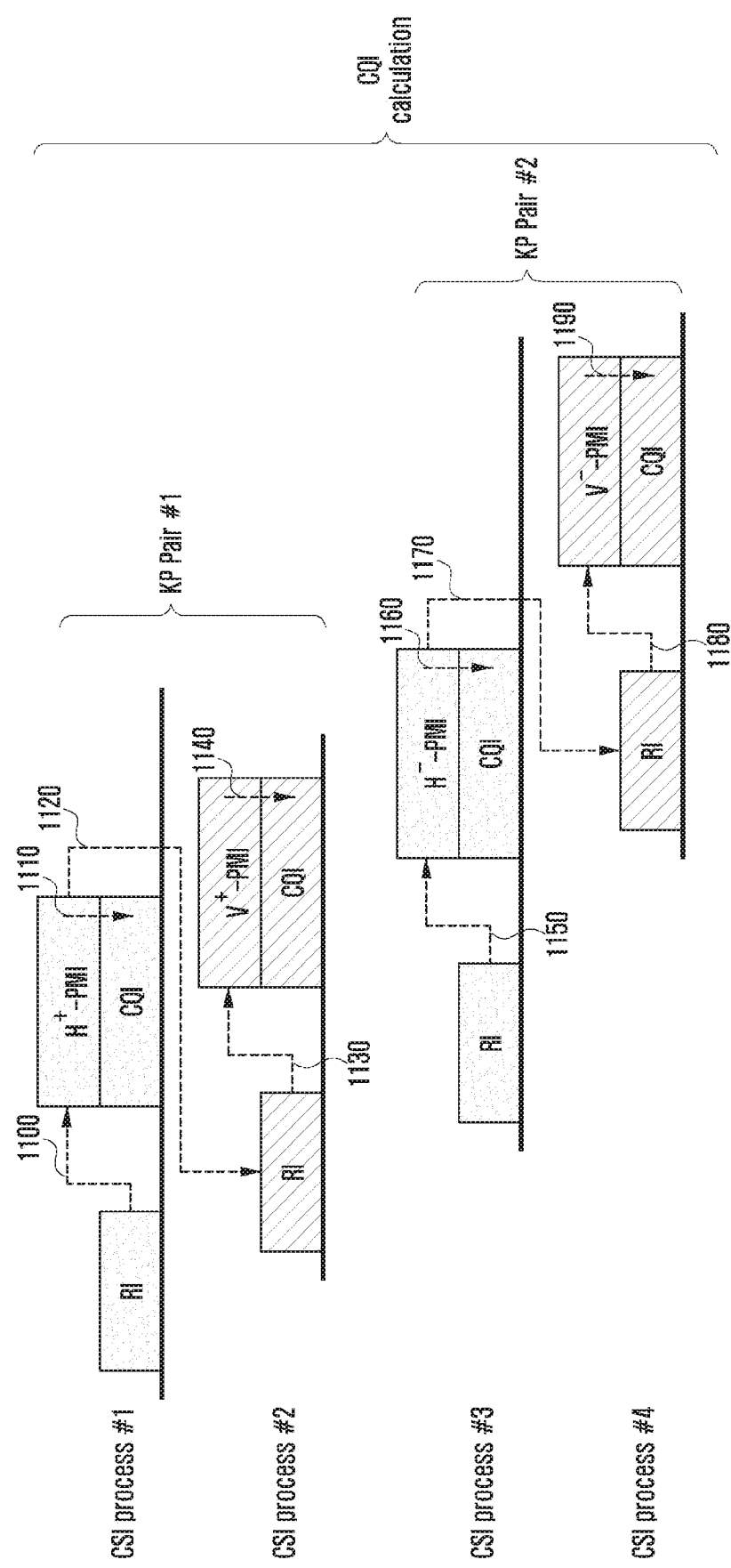
FIG. 11 is a conceptual diagram explaining feedback of channel information for each of a horizontal-axis antenna, a vertical-axis antenna, and a planar antenna according to an embodiment of the present invention.

FIG. 11 is a conceptual diagram explaining feedback of channel information for each of a horizontal-axis antenna, a vertical-axis antenna, and a planar antenna according to an embodiment of the present invention.

Before explanation of FIG. 11, it is assumed that the terminal 200 has already acquired from the base station information on four CSI processes are to be performed and information on what CSI processes the KP operation is performed through. Further, it is assumed that whenever the respective CSI processes are performed, the reference signals for proceeding with the corresponding process are received.

During the performing of the first CSI process (CSI process #1), the terminal 200 acquires RI information at operation 1100, and calculates channel information corresponding to the horizontal (H⁺)-axis antenna of the first planar antenna using the transmitted reference signal at operation 1110. In this case, the calculated channel information may include a PMI value corresponding to the horizontal (H⁺)-axis antenna of the first planar antenna and a CQI value. The terminal may transmit the calculated values directly to the base station 100, or may calculate a correlation value and the final PMI value after performing the subsequent CSI process to transmit the calculated values to the base station 100. It may be pre-notified by the base station 100 or may be engaged in advance whether to transmit the information to the base station 100 for each CSI process or after acquiring the final PMI. Accordingly, the terminal 200 may use the information calculated at operation 1110 in the CSI process subsequently performed as at operation 1120.

Thereafter, the terminal 200 acquires RI information in the second CSI process (CSI process #2) as at operation 1130, and calculates channel information corresponding to the horizontal (R)-axis antenna of the second planar antenna using the reference signal transmitted from the base station 100 at operation 1140. In this case, the calculated channel information may include PMI and CQI values. In FIG. 11, the base station 100 is configured to form one pair of KP operations using the first and second CSI processes. Accordingly, the terminal 200 may acquire the final PMI and CQI through performing of the KP operation using the first and second CSI processes.

Thereafter, the terminal 200 acquires RI information in the third CSI process (CSI process #3) as at operation 1150, and then calculates channel information corresponding to the vertical (V$^+$)-axis antenna of the first planar antenna using the reference signal transmitted from the base station 100. In this case, the calculated information may include PMI and CQI values. Then, the acquired PMI value may be used to calculate the final PMI together with the PMI acquired through performing of the fourth CSI process.

That is, the terminal 200 acquires an RI value information in the fourth CSI process (CSI process #4) at operation 1180, and calculates channel information corresponding to the vertical (V$^-$)-axis antenna using the reference signal transmitted from the base station 100 at operation 1190. Even in this case, the calculated channel information may include PMI and CQI values. In FIG. 11, the base station 100 is configured to form one pair of KP operations using the third and fourth CSI processes. Accordingly, the terminal 200 may acquire the final PMI and CQI through performing of the KP operation using the third and fourth CSI processes.

On the other hand, the three kinds of methods as described above may be additionally combined to be used. In this case, the relationship for the respective CSI processes or between the CSI processes may follow the above-described contents.

Lastly, schemes for PMI generation for configuring feedback information and codebook utilization will be described.

In the present invention, the final PMI is selected through combination of channel information between CSI processes. The feedback information generated by the respective CSI processes may use the same or different codebook sets. Further, the feedback information generated using a combination between the CSI processes may use a codebook set that is the same as or independent of the codebook set as described above. The following drawing illustrates an embodiment of the above-described schemes. As the corresponding codebook set, the existing codebook may be reused as it is. The contents thereof will be described with reference to FIG. 12.

Figure 12:
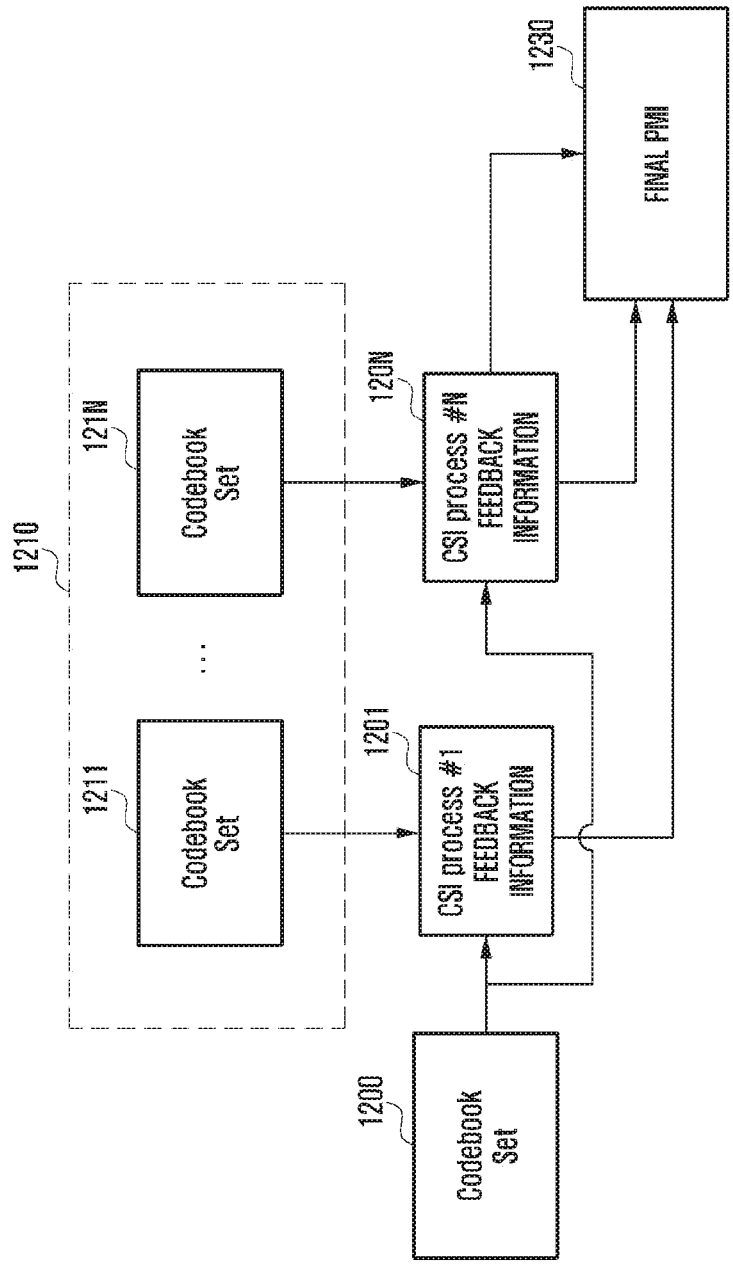
FIG. 12 is a conceptual diagram explaining a method for selecting and using a codebook set for acquiring a final PMI.

FIG. 12 is a conceptual diagram explaining a method for selecting and using a codebook set for acquiring a final PMI.

The terminal 200 may use a codebook set 1200 previously provided in respective CSI processes. As another method, the terminal 200 may use codebook sets 1210 including corresponding codebook sets 1211 to 121N to match the respective CSI process. For example, in the case of using the existing codebook set 1200 as the first CSI process feedback information 1201, the final PMI 1230 may be acquired using the existing codebook set 1200 in the same manner as the subsequent CSI process feedback information.

As another method, the terminal 200 uses new codebook sets 1210, and in the case of using a specific codebook set 1211 corresponding to the first CSI process feedback information 1201, the subsequent CSI process feedback information may use the specific codebook sets for being applied to the corresponding processes in the new codebook sets 1210. For example, as for the N-th CSI process feedback information 120N, the process may be performed using the corresponding codebook set 121N.

In the above-described methods, the final PMI may be acquired using the respective CSI processes generated using the existing codebook set 1200 or the new codebook sets 1210. For example, in the case of rank 1, the final PMI according to the present invention may have the shape as expressed in mathematical expression 7 below, and in the case of rank 2, the final PMI may have the shape as expressed in mathematical expression 8.

[Mathematical Expression 7]
$$W = \begin{pmatrix} b_H^+ \otimes bv^+ \\ \alpha b_H^- \otimes b_V^- \end{pmatrix}$$

[Mathematical Expression 8]
$$W = \begin{pmatrix} b_H^{+(0)} \otimes bv^{+(0)} & b_H^{+(1)} \otimes b_V^{+(0)} \\ \alpha^{(0)} b_H^{-(0)} \otimes b_V^{-(0)} & \alpha^{(0)} b_H^{-(1)} \otimes b_V^{-(1)} \end{pmatrix}$$

In the above example, the final PMI can be acquired using the same or different codebook sets with respect to elements, such as $b_H^+$ and $b_H^-$.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

INDUSTRIAL APPLICABILITY

The present invention can be used in a wireless communication system using a 2D X-Pol antenna.

The invention claimed is:

1. A method for a base station to request feedback information in a wireless communication system using a 2-dimensional (2D) cross polarization (X-Pol) antenna, comprising:
   generating control information including channel state information (CSI) process information of the 2D X-Pol antenna and instruction information on generation of the feedback information, wherein the 2D X-Pol antenna has a first planar and a second planar, and the CSI process information includes a first CSI process for the first planar and a second CSI process for the second planar;
   transmitting the generated control information to a terminal;

generating a first reference signal to be transmitted via the first planar and a second reference signal to be transmitted via the second planar based on the CSI process information;
alternatively transmitting the first reference signal and the second reference signal to the terminal based on the CSI process information;
receiving, from the terminal, first feedback information corresponding to the first CSI process and second feedback information corresponding to the second CSI process based on the CSI process information;
obtaining a first precoding matrix indicator (PMI) based on the first feedback information and a second PMI based on the second feedback information;
determining channel information using the first PMI and the second PMI; and
transmitting data to the terminal based on the channel information.

2. The method of claim 1, wherein the first CSI process is for a vertical axis of the 2D X-Pol antenna, and the second CSI process is for a horizontal axis of the 2D X-Pol antenna.

3. The method of claim 1, wherein the instruction information indicates to transmit the first feedback information and the second feedback information at one time.

4. The method of claim 1, wherein the instruction information indicates to transmit the first feedback information and the second feedback information, respectively.

5. A method for a terminal to generate and transmit feedback information in a wireless communication system using a 2-dimensional (2D) cross polarization (X-Pol) antenna, comprising:
receiving, from a base station, control information including channel state information (CSI) process information of the 2D X-Pol antenna and instruction information on generation of the feedback information, wherein the 2D X-Pol antenna has a first planar and a second planar, and the CSI process information includes a first CSI process for the first planar and a second CSI process for the second planar;
alternatively receiving, from the base station, a first reference signal and a second reference signal based on the CSI process information;
generating first feedback information using the received first reference signal and second feedback information using the received second reference signal; and
transmitting, to the base station, the first feedback information and the second feedback information based on the instruction information,
wherein the base station is configured to:
receive the first feedback information corresponding to the first CSI process and the second feedback information corresponding to the second CSI process based on the CSI process information;
obtain a first precoding matrix indicator (PMI) based on the first feedback information and a second PMI based on the second feedback information;
determine channel information using the first PMI and the second PMI; and
transmit data to the terminal based on the channel information.

6. The method of claim 5, wherein the instruction information indicates to transmit the first feedback information and the second feedback information at one time.

7. The method of claim 5, wherein instruction information indicates to transmit the first feedback information and the second feedback information, respectively.

8. The method of claim 5, wherein the first CSI process is for a vertical axis of the 2D X-Pol antenna, and the second CSI process is for a horizontal axis of the 2D X-Pol antenna.

9. A base station in a wireless communication system using a 2D cross polarization (X-Pol) antenna, comprising:
the 2D X-Pol antenna having a first planar and a second planar;
a base station communication circuitry configured to transmit control information and the reference signal to a terminal, and to receive feedback information corresponding from the terminal; and
a base station controller configured to:
generate control information including channel state information (CSI) process information of the 2D X-Pol antenna and instruction information on generation of the feedback information, wherein the 2D X-Pol antenna has a first planar and a second planar, and the CSI process information includes a first CSI process for the first planar and a second CSI process for the second planar,
transmit the generated control information to the terminal,
generate a first reference signal to be transmitted via the first planar and a second reference signal to be transmitted via the second planar based on the CSI process information,
alternately transmit the first reference signal and the second reference signal to the terminal based on the CSI process information,
receive first feedback information corresponding to the first CSI process and second feedback information corresponding to the second CSI process based on the control information,
obtain a first precoding matrix indicator (PMI) based on the first feedback information and a second PMI based on the second feedback information,
determine channel information using the first PMI and the second PMI, and
transmit data to the terminal based on the channel information.

10. The base station of claim 9, wherein the first CSI process is for a vertical axis of the 2D X-Pol antenna, and the second CSI process is for a horizontal axis of the 2D X-Pol antenna.

11. The base station of claim 9, wherein the instruction information indicates to transmit the first feedback information and the second feedback information at one time.

12. The base station of claim 9, wherein instruction information indicates to transmit the first feedback information and the second feedback information, respectively.

13. A terminal to generate and transmit feedback information in a wireless communication system using a 2-dimensional (2D) cross polarization (X-Pol) antenna, comprising:
a terminal communication circuitry configured to:
receive control information including channel state information (CSI) process information of the 2D X-Pol antenna and instruction information on generation of the feedback information, and
alternatively receive a first reference signal and a second reference signal, wherein the 2D X-Pol antenna has a first planar and a second planar, and the CSI process information includes a first CSI process for the first planar and a second CSI process for the second planar; and a terminal controller configured to:
  generate first feedback information using the received first reference signal and second feedback information using the received second reference signal; and
  transmit the first feedback information and the second feedback information to the base station based on the instruction information,
wherein the base station is configured to:
  receive the first feedback information corresponding to the first CSI process and the second feedback information corresponding to the second CSI process based on the CSI process information;
  obtain a first precoding matrix indicator (PMI) based on the first feedback information and a second PMI based on the second feedback information;
  determine channel information using the first PMI and the second PMI; and
  transmit data to the terminal based on the channel information.

14. The terminal of claim 13, wherein the instruction information indicates to transmit the first feedback information and the second feedback information at one time.

15. The terminal of claim 13, wherein instruction information indicates to transmit the first feedback information and the second feedback information, respectively.

16. The terminal of claim 13, wherein the first CSI process is for a vertical axis of the 2D X-Pol antenna, and the second CSI process is for a horizontal axis of the 2D X-Pol antenna.

\* \* \* \* \*